(12) United States Patent
Tulloch et al.

(10) Patent No.: US 12,435,750 B2
(45) Date of Patent: Oct. 7, 2025

(54) AIRCRAFT WING-PYLON CONNECTION

(71) Applicant: AIRBUS OPERATIONS LIMITED, Bristol (GB)

(72) Inventors: William Tulloch, Bristol (GB); Pat Broomfield, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 348 days.

(21) Appl. No.: 17/801,376

(22) PCT Filed: Feb. 16, 2021

(86) PCT No.: PCT/EP2021/053716
§ 371 (c)(1),
(2) Date: Aug. 22, 2022

(87) PCT Pub. No.: WO2021/170450
PCT Pub. Date: Sep. 2, 2021

(65) Prior Publication Data
US 2023/0010520 A1  Jan. 12, 2023

(30) Foreign Application Priority Data
Feb. 24, 2020 (GB) .................................. 2002563

(51) Int. Cl.
*F16B 43/02* (2006.01)
*B64C 3/32* (2006.01)
*B64D 27/40* (2024.01)

(52) U.S. Cl.
CPC ................ *F16B 43/02* (2013.01); *B64C 3/32* (2013.01); *B64D 27/402* (2024.01); *B64D 27/404* (2024.01)

(58) Field of Classification Search
CPC .... B64D 27/40; B64D 27/402; B64D 27/404; B64D 27/406; B64D 29/02; B64C 3/32; F16B 43/02
See application file for complete search history.

(56) References Cited

U.S. PATENT DOCUMENTS

2010/0133376 A1* 6/2010 Foyer .................. B64D 27/406
                                                                  244/54
2013/0259600 A1   10/2013 Kerechanin, II
(Continued)

FOREIGN PATENT DOCUMENTS

DE    202015101762 U1 *  6/2015 ............. F16B 43/02
EP    3 498 609            6/2019
(Continued)

OTHER PUBLICATIONS

English translation of WO-2018192787-A1 (Year: 2018).*
(Continued)

*Primary Examiner* — Thomas P Burke
(74) *Attorney, Agent, or Firm* — Nixon & Vanderhye P.C.

(57) ABSTRACT

An aircraft assembly including a wing component and an engine mounting pylon component. The wing component has three fastening locations arranged in a triangle and a plane. The engine mounting pylon component is connected to the wing component by three tension fasteners, wherein each of the tension fasteners passes through a different one of the fastening locations. The wing component comprises three first spherical surfaces positioned such that the center of each first spherical surface is at a different one of the fastening locations. The engine mounting pylon component comprises three second spherical surfaces having equal and opposite curvature to the first spherical surfaces. Each of the second spherical surfaces is in contact with a different one of the first spherical surfaces.

16 Claims, 4 Drawing Sheets

(56) References Cited

U.S. PATENT DOCUMENTS

| | | | | |
|---|---|---|---|---|
| 2014/0151497 A1* | 6/2014 | Weir | ...................... | B64D 27/40 |
| | | | | 244/54 |
| 2015/0013142 A1 | 1/2015 | West | | |
| 2015/0300401 A1 | 10/2015 | Hyatt et al. | | |
| 2018/0283272 A1* | 10/2018 | Curlier | ...................... | F02K 3/06 |
| 2019/0055027 A1 | 2/2019 | Martin | | |
| 2019/0152616 A1* | 5/2019 | Pautis | .................... | B64D 27/18 |

FOREIGN PATENT DOCUMENTS

| | | |
|---|---|---|
| FR | 2 963 608 | 2/2012 |
| WO | 2018/192787 | 10/2018 |
| WO | WO-2018192787 A1 * | 10/2018 ............... B64C 3/32 |

OTHER PUBLICATIONS

English translation of DE 202015101762 U1 (Year: 2015).*
International Search Report and Written Opinion of the ISA for PCT/EP2021/053716, mailed Jun. 30, 2021, 21 pages.

* cited by examiner

AIRCRAFT WING-PYLON CONNECTION

RELATED APPLICATION

This application is the U.S. national phase of International Application PCT/EP2021/053716, filed Feb. 16, 2021, which designated the U.S. and claims priority to United Kingdom patent application GB 2002563.1, filed Feb. 24, 2020, the entire contents of each of which are hereby incorporated by reference.

TECHNICAL FIELD

The present invention relates to an aircraft assembly comprising a wing and an engine mounting pylon connected to the wing, and to an aircraft comprising such a connected wing and pylon.

BACKGROUND

Most conventional aircraft have engines mounted to the wings by engine mounting pylons. For commercial airliners there is a trend toward higher bypass ratio engines, which have larger diameters than lower bypass ratio engines. To accommodate large diameter engines whilst maintaining sufficient clearance between the engine and the ground it is desirable to minimize the vertical distance between the top of the engine and the lower surface of the wing.

Conventionally, an engine mounting pylon is attached to a wing box by a set of couplings interposed vertically between the wing box and the primary structure of the pylon, which generally constitute a statically determined interface, or one with a low level of hyperstaticity. These couplings transmit forces between the engine mounting pylon and the wing box, including the static weight of the engine and the thrust loads generated by the engine, and at the same time allow a certain freedom of movement between both components. Known designs of such couplings require the top surface of the engine mounting pylon to be spaced apart vertically from the lower surface of the wing box, and are therefore not suitable for use with very large diameter engines.

In order to minimize the vertical distance between the top of the engine and the lower surface of the wing, it is desirable to attach the engine mounting pylon directly to the wing. However; the lower surface of the wing is curved, due to the aerofoil shape whilst the upper surface of an engine mounting pylon is typically substantially flat (planar). Furthermore, manufacturing tolerances make it difficult to predict the exact shape of the lower wing surface in advance. To achieve effective load transmission between the pylon and the wing, close contact between the two must be achieved at least in the locations where fasteners joining the pylon and wing are present. Conventionally, the assembly process would require machining of one or both of the wing lower surface and the pylon upper surface, at the time of joining the pylon to the wing, to ensure sufficiently close contact. Such machining is time consuming and therefore not compatible with high-rate manufacture. It is therefore desirable to provide a mechanism for assembling a close-coupled wing-pylon assembly which is both fast and able to reliably achieve close contact between the wing and pylon.

SUMMARY

A first aspect of the present invention provides an aircraft assembly comprising a wing component and an engine mounting pylon component. The wing component comprises three fastening locations arranged in a triangle such that they define a plane. The engine mounting pylon component is connected to the wing component by three tension fasteners, wherein each of the tension fasteners passes through a different one of the fastening locations. The wing component comprises three first spherical surfaces positioned such that the centre of each first spherical surface is at a different one of the fastening locations. The engine mounting pylon component comprises three second spherical surfaces having equal and opposite curvature to the first spherical surfaces. Each of the second spherical surfaces is in contact with a different one of the first spherical surfaces.

Optionally, for each pair of contacting spherical surfaces, a convex spherical surface of the pair has a greater surface area than a convex spherical surface of the pair.

Optionally, the assembly is configured such that, during operation of the assembly on an aircraft, each tension fastener transfers only vertical load between the engine mounting pylon component and the wing component.

Optionally, a surface of the wing component which faces the engine mounting pylon component is curved, and a surface of the engine mounting pylon component which faces the wing component is substantially flat.

Optionally, each first spherical surface is formed integrally with the wing component and each second spherical surface is formed integrally with the engine mounting pylon component.

Optionally, an interface fitting is present at each fastening location, the interface fitting comprising a first part comprising the first spherical surface and being fixedly attached to the wing component; and a second part comprising the second spherical surface and being fixedly attached to the engine mounting pylon component. Optionally, the interface fitting comprises a spherical washer.

Optionally, the assembly further comprises at least one thrust-transferring connection between the engine mounting pylon component and the wing component. Optionally, the assembly is configured such that, during operation of the assembly on an aircraft, the or each thrust-transferring connection transfers only lateral load between the engine mounting pylon component and the wing component. Optionally, the at least one thrust-transferring connection comprises a spigot.

Optionally, at least one of the tension fasteners comprises a fail-safe fastener.

Optionally, a secondary tension fastener is associated with each tension fastener, each secondary tension fastener being located at substantially the same location as the associated tension fastener. Optionally, each first spherical surface and corresponding second spherical surface encompasses a first bore through which one of the tension fasteners extends and a second bore through which the associated secondary tension fastener extends.

A second aspect of the invention provides an aircraft comprising the assembly of the first aspect.

Optionally, the aircraft further comprises an ultra-high bypass ratio (UHBR) engine mounted on the engine mounting pylon.

A third aspect of the invention provides a method of forming an aircraft assembly. The method comprises:
- providing an aircraft wing component having three first spherical surfaces at intended locations of tension fasteners to be used to attach an engine mounting pylon to the wing component, wherein the three first spherical surfaces are arranged so that they define a plane;

providing three second spherical surfaces having opposite curvature to the first spherical surfaces, at intended locations of the tension fasteners;

providing an engine mounting pylon component;

arranging the three second spherical surfaces in contact with the three first spherical surfaces;

arranging the engine mounting pylon on the wing component;

installing the tension fasteners at the intended locations.

A fourth aspect of the invention provides a spherical washer comprising a male part having a convex spherical surface; a female part having a concave spherical surface, engageable with the male part such that the concave spherical surface is in contact with the convex spherical surface and such that the female part and the male part are able to pivot relative to each other when engaged; and two bores having parallel axes, each bore extending through the male part and the female part.

Optionally, the spherical washer further comprises an anti-rotation feature configured to limit relative rotation, about an axis parallel to the bores, of the male and female parts when the male and female parts are engaged.

Optionally, the spherical washer further comprises a retention clip configured to retain the male and female parts in engagement with each other, wherein the retention clip is configured to permit relative pivoting of the male and female parts and to substantially prevent separation of the male and female parts.

Optionally, one or both of the male part and the female part comprises two or more spherical surfaces, each having the same curvature.

BRIEF DESCRIPTION OF THE DRAWINGS

Embodiments of the invention will now be described, by way of example only, with reference to the accompanying drawings, in which:

FIG. 1b is a partial top view of an example engine mounting pylon comprised in the assembly of FIG. 1a;

FIG. 1c is a bottom view of an example wing comprised in the assembly of FIG. 1a;

FIG. 4b is a perspective view of the female part of the example spherical washer of FIG. 4a;

DETAILED DESCRIPTION

The following examples each relate to an aircraft assembly comprising a wing component and an engine mounting pylon component. The wing component comprises three fastening locations arranged in a triangle such that they define a plane. The engine mounting pylon component is connected to the wing component by three tension fasteners. Each of the tension fasteners passes through a different one of the fastening locations. The wing component comprises three first spherical surfaces positioned such that the centre of each spherical surface is at a different one of the fastening locations. The engine mounting pylon component comprises three second spherical surfaces having equal and opposite curvature to the first spherical surfaces. Each of the second spherical surfaces is in contact with a different one of the first spherical surfaces.

Example aircraft assemblies according to the invention provide two key advantages. Firstly, because the wing component and the engine mounting component can be in direct contact with each other, the vertical height of the connection between the engine mounting pylon and the wing can be relatively small compared to alternative known arrangements. This makes assemblies according to the invention particularly suitable for use on aircraft with large diameter engines. However; the main advantage of the aircraft assemblies according to the invention is that they are simple and fast to assemble even in the face of manufacturing tolerances, which facilitates high-rate aircraft manufacture. How this advantageous effect is achieved will become apparent from the following description of various example assemblies according to the invention.

Figure 1A:
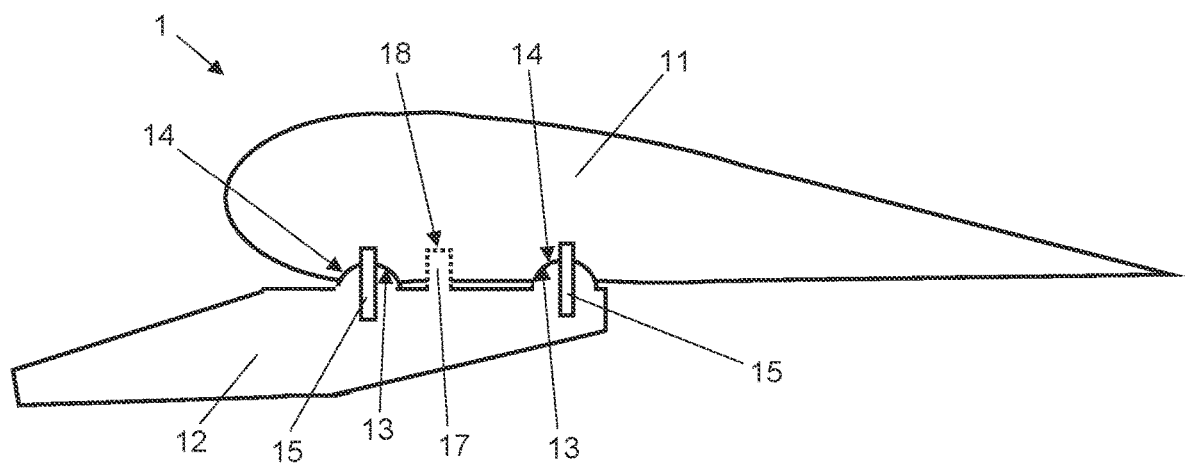
FIG. 1a is a schematic cross-section through an example assembly according to the invention.

FIG. 1a is a schematic cross-section through an example aircraft assembly 1 according to the invention. The assembly 1 comprises a wing component 11 and an engine mounting pylon component 12. The wing component 11 may be any component which forms at least part of an external surface of an aircraft wing, such as a skin panel. The wing component 11 may be a unitary component or it may be formed from multiple subcomponents. The pylon component 12 may be any component which forms at least part of an external surface of an aircraft engine mounting pylon. The pylon component 12 may be a unitary component or it may be formed from multiple subcomponents. The pylon component 12 is connected to the wing component 11 by three tension fasteners 15. Each tension fastener 15 extends into the wing component 11 and into the pylon component 12. The location at which a tension fastener 15 extends into the wing component 11 is preselected and defines a fastening location of the assembly 1. The assembly 1 therefore has three fastening locations.

Figure 1B:
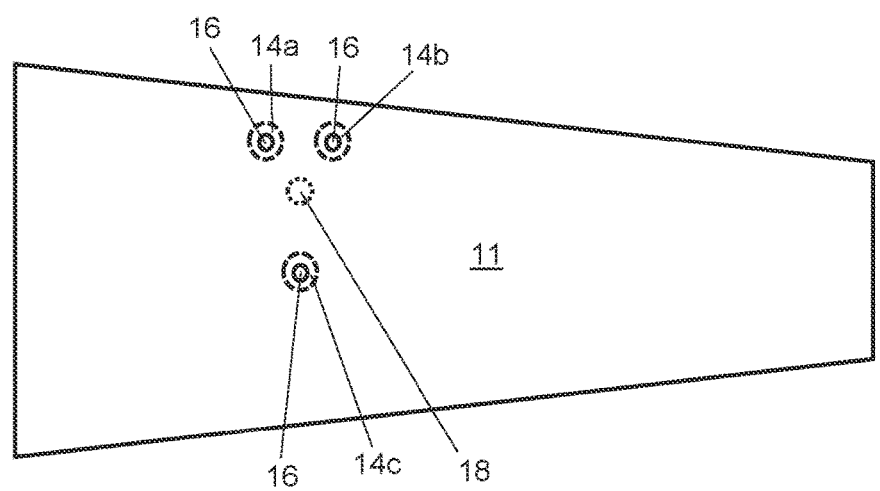
Figure 1C:
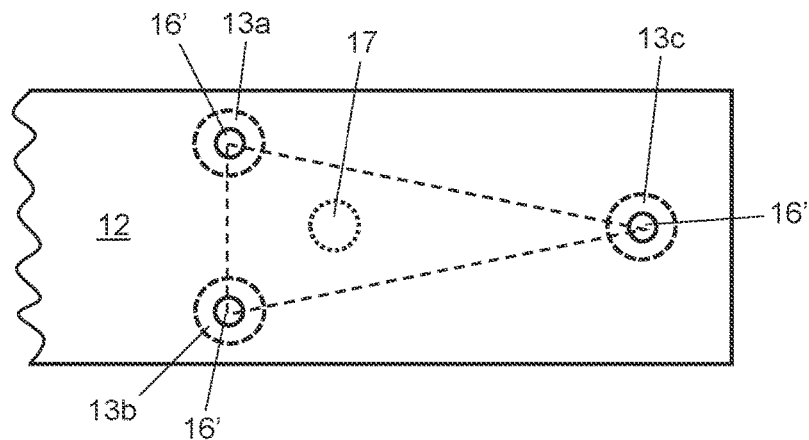

FIG. 1b is a bottom view of the wing component 11, showing the arrangement of the fastening locations. FIG. 1c is a top view of part of the pylon component 12, showing corresponding locations at which the tension fasteners 15 extend into the pylon component 12. It can be seen from FIGS. 1b and 1c that the fastening locations are arranged in a triangle. In the particular illustrated example, two of the fastening locations are at relatively forward positions (with respect to a normal direction of travel of an aircraft in which the assembly 1 is comprised) and the third fastening location is at a relatively rearward position. The triangular arrangement means that the fastening locations define a plane, which is advantageous for reasons that will become apparent. The aircraft assembly 1 may be comprised in an aircraft of any type, although it may be particularly advantageous when used on a commercial airliner.

At each fastening location, the wing component 11 comprises a concave spherical surface 14. Each concave spherical surface 14, 14a, 14b and 14c is positioned such that the centre of the spherical surface 14 (with respect to its curvature) is located at one of the fastening locations. At each corresponding location on the pylon component 12, the pylon component 12 comprises a convex spherical surface 13. Each convex spherical surface 13, 13a, 13b and 13c is positioned such that the centre of the spherical surface 13 (with respect to its curvature) is located at one of the corresponding locations. In some examples, the convex spherical surfaces may be comprised in the wing component 11 and the concave spherical surfaces may be comprised in the pylon component 12. In some examples the wing component 11 may comprise a convex spherical surface at one of the fastening locations and a concave spherical surface at another of the fastening locations. In such examples the pylon component 12 will consequently also comprise a convex spherical surface at one location (that is, a location on the pylon component corresponding to a fastening location having a concave spherical surface) and a concave spherical surface at another location (that is, a location on the pylon component corresponding to a fastening location having a convex spherical surface).

At each fastening location, the concave spherical surface is in contact with the corresponding convex spherical surface. Corresponding spherical surfaces have equal and opposite curvature, although they need not be equal in size or shape. Indeed, it may be advantageous for the convex spherical surface to have a larger surface area than the concave spherical surfaces, as is the case for the illustrated example. In general, for each pair of contacting spherical surfaces, a convex spherical surface of the pair may have a greater surface area than a convex spherical surface of the pair. The spherical surfaces 14 on the wing component 11 (referred to as first spherical surfaces) are arranged in a triangle by virtue of being disposed at the fastening locations. The spherical surfaces 13 on the pylon component 12 (referred to as second spherical surfaces) are arranged in a triangle of identical size and shape to the triangle formed by the spherical surfaces 14 on the wing component. This means that the first and second spherical surfaces 14, 13 are in close contact across (at least) a significant area of one or both of the first and second spherical surfaces 14, 13. The area across which the first and second spherical surfaces 14, 13 are in contact is dependent on the size and shape of the first and second spherical surfaces 14, 13. This contact area is large enough to ensure effective transfer between the engine mounting pylon component 12 and the wing component 11 of the expected operational loads experienced during operation of an aircraft in which the assembly 1 is comprised. The size and shape of the first and second spherical surfaces 14, 13 may therefore be selected in dependence on the expected operational loads. In the illustrated example, the size, shape and curvature of the first and second spherical surfaces 14, 13, is the same for each pair of corresponding first and second spherical surfaces. However; this need not be the case in other examples. In the illustrated example the first and second spherical surfaces 14, 13 are circular, however this need not be the case in other examples.

Each tension fastener 15 extends through a fastener hole or bore jointly defined by the wing component 11 and the pylon component 12. A first section 16 of each bore is defined by the wing component 11. Each first bore section 16 extends into one of the first spherical surfaces 14. Each first bore section 16 may be located centrally within the corresponding first spherical surface 14 (as defined by the curvature), in which case the centre of each first bore section 16 is at one of the fastening locations. A second section 16' of each bore is defined by the pylon component 12. Each second bore section 16' extends into one of the second spherical surfaces 13. Each second bore section 16' may be located centrally within the corresponding second spherical surface 13 (as defined by the curvature). Each first and second bore section 16, 16' may extend substantially perpendicularly to the spherical surface into which it extends. In the assembly 1 it is not necessary for the axes of the first and second bore sections 16, 16' to be parallel (although they may be). In some examples the diameter of the first bore section 16 of a given bore may be smaller or larger than the diameter of the second bore section 16' of that bore. This enables the bore to accommodate a tension fastener 15 even in case the axes of the first and second bore sections 16, 16' are not parallel. The amount by which the axes of the first and second bore sections 16, 16' can be angled with respect to each other whilst still being able to accommodate a tension fastener 15 will depend on the difference in their respective diameters (a larger difference permits a greater angle).

Figure 2A:
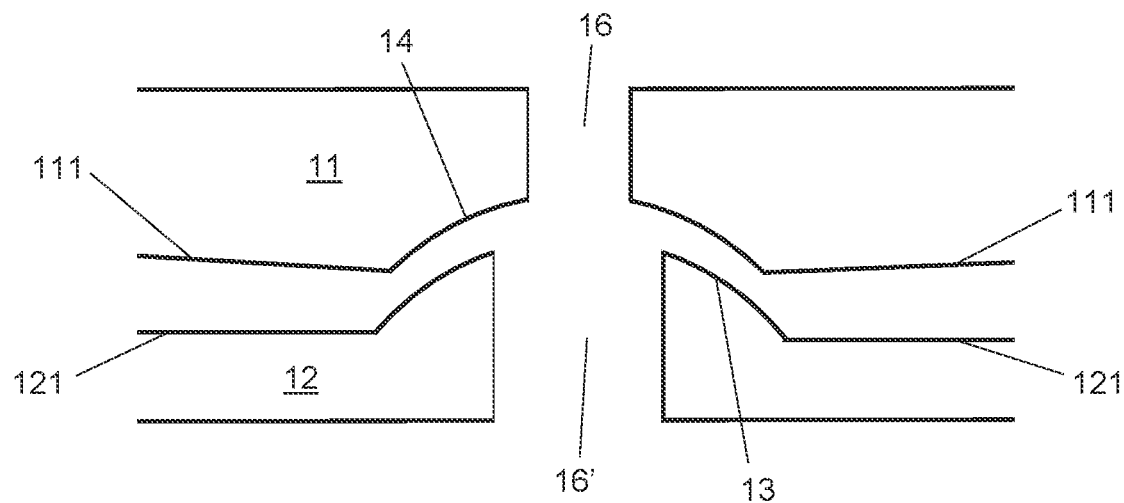
FIG. 2a is a partial cross-section through the example wing and pylon of FIGS. 1a-c, in a disassembled state.
Figure 2B:
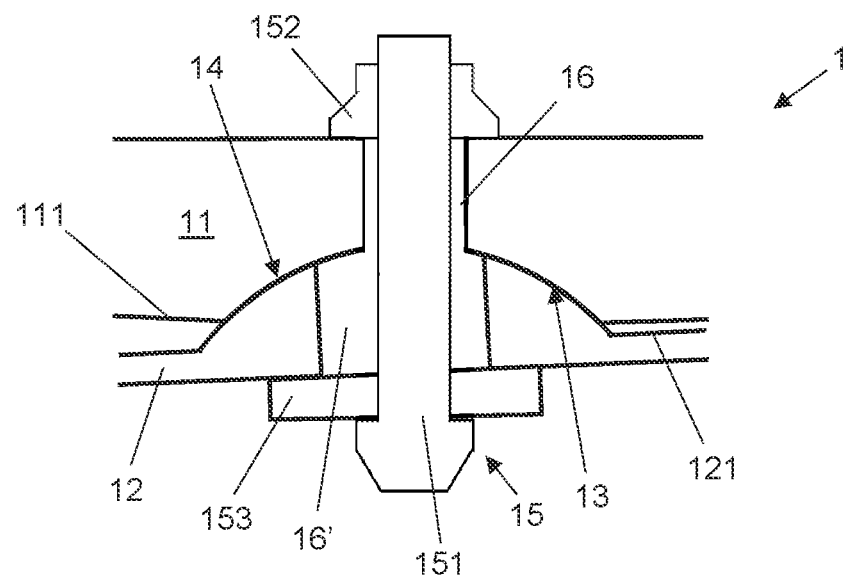
FIG. 2b is a partial cross-section through the example assembly of FIG. 1a, at the location of a tension fastener.

FIGS. 2a and 2b show the assembly 1 in the region of an example one of the fastening locations in detail. Each other fastening location region of the assembly 1 may have substantially the same features as described below for the example fastening location region. FIG. 2a is a cross-section through a part of the wing component 11 and the pylon component 12 in the region of the example fastening location, with the wing component 11 and pylon component 12 in a disassembled state (that is, the concave and convex spherical surfaces 14, 13 are not in contact and no tension fastener 15 is present in the bore). FIG. 2b is a cross-section through the same part of the wing component 11 and pylon component 12 but in an assembled state in which the wing component 11 and pylon component 12 are held together by at least one tension fastener 15. It can be seen from FIGS. 2a and 2b that, in this example, the first spherical surface 14 is formed integrally with the wing component 11 and the second spherical surface 13 is formed integrally with the pylon component 12. The regions of the assembly 1 around the other fastening locations have substantially the same detailed configuration as the region shown in FIGS. 2a and 2b, although this need not be the case in all examples.

FIG. 2b shows that, at the depicted fastening location, the second bore part 16' is angled with respect to the first bore part 16 (that is, the axis of the second bore part 16' is not parallel to the axis of the first bore part 16). This is because, in the particular illustrated example assembly 1, the relative orientation of the pylon component 12 and the wing component 11 are slightly different to a nominal design orientation for that assembly. Such deviations from the nominal relative orientation may occur, for example, due to manufacturing tolerances associated with the wing component 11 and/or the pylon component 12. However; despite the deviation from the nominal relative orientation, it can be seen from FIG. 2b that there is close contact between the pylon component 12 and the wing component 11 over an annular region surrounding the bore (and therefore surrounding the tension fastener 15). Close contact in this region, in spite of a deviation from the nominal relative orientation of the wing component 11 and pylon component 12, is enabled by the first bore part 16 having a larger diameter than the second bore part 16', and also by the first spherical surface 14 being slightly larger than the second spherical surface 13.

In general, an assembly according to the invention will be formed such that one of the components (in this case the wing component 11) defines a reference orientation of the assembly 1, and may therefore be considered to be a "reference component". The tension fasteners 15 are installed at a preselected angle to the reference component, such that they are parallel to the first bore parts 16. Furthermore, the tension fasteners 15 are installed such that they are seated substantially centrally within the first bore parts 16. This ensures effective load transfer between the tension fasteners 15 and the wing component 11. Manufacturing tolerances associated with the wing component 11 make it difficult to tightly control the exact three dimensional position of each of the fastening locations (in relation to the rest of the wing component 11), and this means it is difficult to tightly control the angle (with respect to the reference orientation) of the plane defined by the three fastening locations. However, the triangular arrangement of the fastening locations ensures that they will always define a plane, irrespective of how the individual fastening locations may deviate from the nominal design positions of those fastening locations.

The same considerations apply to the corresponding locations on the pylon component 12, although with a conventional flat-topped pylon design it may be easier to tightly control the three dimensional positions of the corresponding locations. Thus, the fastening locations on the wing component 11 will always define a plane (irrespective of manufacturing tolerances), and the corresponding locations on the pylon component 12 will also always define a plane (irrespective of manufacturing tolerances). This ensures that when the wing component 11 and the pylon component 12 are brought together during a process of forming the assembly 1, the fastening locations and corresponding locations will always be able to contact the corresponding locations.

If point contact between the wing component 11 and the pylon component 12 at the fastening locations were acceptable, then it would not be necessary to provide spherical surfaces at the fastening locations and corresponding locations. However, as explained above, for an assembly comprised in a joint between a wing and an engine mounting pylon it is necessary for the wing component to be in close contact with the pylon component across a region to ensure effective transfer of load across the joint (with the size of the region being dependent on the size of the loads to be transferred). Close contact over a region at each of the fastening locations, in the situation where the angle of the plane defined by the fastening locations with respect to the reference orientation is not tightly controlled, is achieved by providing the first spherical surfaces at the fastening locations and the matching second spherical surfaces at the corresponding locations on the pylon component 12. The use of spherical surfaces at the fastening locations means that the nature of the contact between the wing component 11 and pylon component 12 is not affected by variations in the angle of the plane defined by the fastening locations (or by variations in the angle of the plane defined by the corresponding locations).

It can be seen in FIGS. 2a and 2b that the diameter of the second bore part 16' is larger than the diameter of the first bore part 16, and that this ensures that the stem of the tension fastener 15 does not contact the second bore part 16'. This is important, to ensure that substantially only tension loads are transmitted by the tension fastener 15. The size difference between the second bore part 16' and the first bore part 16 in the illustrated example is sufficiently great that a larger (than that which is shown) difference in the angles of the first and second bore parts 16, 16' could be accommodated. Preferably the smallest diameter of a given bore (in this example the diameter of the first bore part 16) is larger than the diameter of the stem of the fastener 15 which extends through that bore. This is necessary to minimize or prevent the transfer of shear loads between the fastener 15 and the wing component 11 and between the fastener 15 and the pylon component 12. The assembly 1 may be configured (e.g. due to the respective diameters of the bore parts and tension fasteners) such that, during operation of the assembly 1 on an aircraft, each tension fastener 15 transfers only vertical load between the engine mounting pylon component 12 and the wing component 11.

It can also be seen from FIGS. 2a and 2b that a surface 111 of the wing component 11 that faces the pylon component 12 is curved whilst a surface 121 of the pylon component 12 that faces the wing component 11 is substantially flat. This need not be the case in all examples, but is likely to be the case where the wing component 11 is comprised in a wing having a substantially conventional design and the pylon component 12 is comprised in a pylon having a substantially conventional design. The curved nature of the wing component 11 contributes to the difficulty in tightly controlling the three-dimensional position of the fastening locations.

The tension fastener 15 in this example is a tension bolt. It comprises a bolt part 151, having a threaded stem with a head at one end, and a nut part 152 which is threadingly engaged with the stem of the bolt part 151. The nut part 152 is adjacent the wing component 11 and the head of the bolt part 151 is adjacent the pylon component 12. A washer 153 is disposed between the head of the bolt part 151 and the pylon component 12. The tension fastener 15 is not perpendicular to the surface of the pylon component 12 against which the head lies. To accommodate this angular mismatch, the washer 153 is an adjustable washer configured such that the angle between opposite faces of the washer is adjustable. For example, the washer 153 may be a spherical washer. In some examples the tension fastener 15 may comprise a fail-safe fastener. For example, the tension fastener 15 may comprise a nested coaxial bolt arrangement, in which both the inner and outer bolts are individually able to transfer the full operational load expected to be experienced by the tension fastener 15 during operation of the assembly 1 on an aircraft.

Returning to FIGS. 1a-c, the assembly 1 further comprises a thrust transferring connection between the pylon component 12 and the wing component 11. In this example the thrust transferring connection comprises a spigot 17 on the pylon component 12, which engages with a corresponding socket 18 on the wing component 11. The spigot 17 extends substantially vertically with respect to a cruise orientation of the aircraft assembly 1. One end of the spigot 17 is fixedly attached to an upper surface of the pylon component 12 and the other (free) end of the spigot 17 is engaged with the socket in the lower surface of the wing component 11. In other examples this arrangement may be reversed such that the spigot 17 is provided on the wing component and the socket is provided on the pylon component 11. The engagement of the spigot 17 with the socket 18 permits some axial movement of the spigot relative to the socket. However, relative radial movement of the spigot 17 and socket 18 is constrained by the engagement between the spigot 17 and the socket 18. Thrust generated by an engine mounted on an engine mounting pylon in which the pylon component 12 is comprised may thereby be transferred to the wing component 11 to drive forward motion of an aircraft in which the assembly 1 is comprised.

Figure 3:
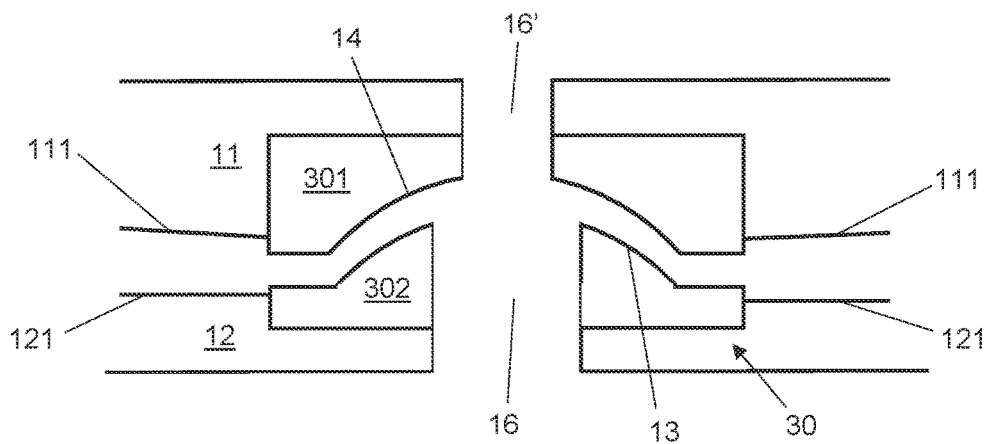
FIG. 3 is a partial cross-section through an alternative configuration of the example wing and pylon of FIGS. 1a-c, in a disassembled state.

FIG. 3 shows an alternative configuration for the assembly 1 in the region of a fastening location. Similar to FIG. 2a, FIG. 3 shows only the wing component 11 and the pylon component 12, in a disassembled state. The additional features of the assembled state shown in FIG. 2b are equally applicable to the alternative configuration of FIG. 3. The alternative configuration of FIG. 3 differs from the configuration shown in FIGS. 2a and 2b in that an interface fitting 30 is present at the fastening location. The interface fitting 30 comprises a first part 301 which comprises the first spherical surface 14 and which is fixedly attached to the wing component 11. The interface fitting 30 further comprises a second part 302 which comprises the second spherical surface 13 and which is fixedly attached to the engine mounting pylon component 12.

Since the first spherical surface 14 is concave and the second spherical surface 13 is convex, the first part 301 may be considered to be a female part and the second part 302 may be considered to be a male part. In other examples the male and female parts of the interface fitting 30 may be reversed (such that the male part is fixedly attached to the wing component 11 and the female part is fixedly attached to the pylon component 12). The attachment of the first and second parts 301, 302 to the respective components may be according to any suitable technique known in the art.

The interface fitting 30 may comprise, for example, a spherical washer. There are various reasons why it may be advantageous to provide such an interface fitting rather than forming the first and second spherical surfaces 14, 13 integrally with the wing and pylon components 11, 12. For example, it may be easier and quicker to attach a pre-existing interface fitting part to a wing component 11 and/or a pylon component 12 than to form a spherical surface in a wing component 11 and/or a pylon component 12, in which case use of the interface fitting can speed up the aircraft assembly process. Alternatively or additionally, it may be desirable for the spherical surfaces to be formed from a material having different material properties to a material from which the rest of the wing component 11 or pylon component 12 is formed.

Figure 4A:
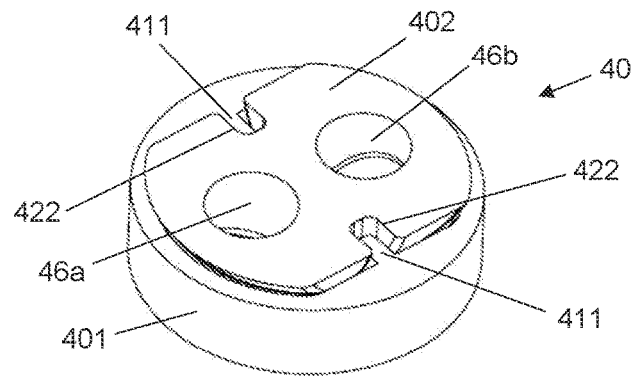
FIG. 4a is a perspective view of an example spherical washer according to the invention.
Figure 4B:
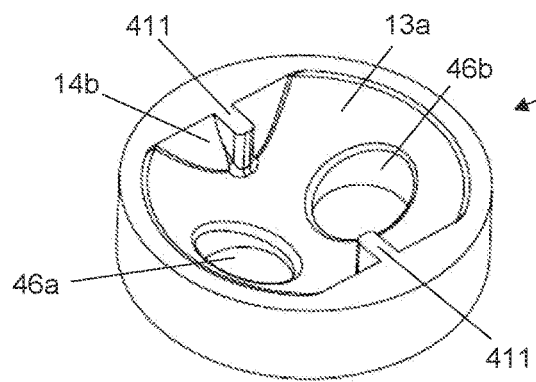
Figure 4C:
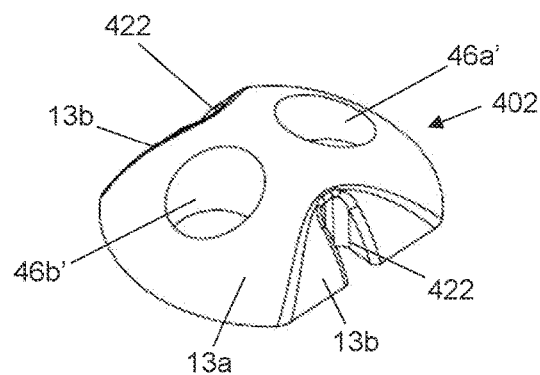
FIG. 4c is a perspective view of the male part of the example spherical washer of FIG. 4b.

FIGS. 4a-c show a particular example spherical washer 40 suitable for use in an assembly according to the invention. In common with a standard spherical washer, and with the interface fitting 30, the spherical washer 40 comprises a male part 402 (shown in isolation in FIG. 4c) having a convex first spherical surface and a female part 401 (shown in isolation in FIG. 4b) having a concave second spherical surface. The female part 401 is engageable with the male part 402 such that the first spherical surface is in contact with the second spherical surface, and such that the male part 402 and the female part 401 are able to pivot relative to each other when engaged. The male and female parts 402, 401 may be able to pivot relative to each other about at least two perpendicular axes when engaged. The spherical washer 40 has various features which may also be applied, without significant modification, to an assembly in which the first and/or second spherical surfaces are formed integrally with their respective components. Various features of the spherical washer 40 may also be applied, without significant modification, to the interface fitting 30.

Each of the male and female parts 402, 401 comprises two separate spherical surfaces. In particular, each part 402, 401 comprises a primary spherical surface 13a, 14a having a relatively larger area and a secondary spherical surface 13b, 14b having a relatively smaller area. In the illustrated example the primary spherical surfaces 13a, 14a are continuous whereas the secondary spherical surfaces 13b, 14b are discontinuous. The magnitude of the curvature of the primary and secondary spherical surfaces 13a, 14a, 13b, 14b is equal. The effect of providing first and second spherical surfaces which each comprise a combination of primary and secondary spherical surfaces arranged as shown in FIGS. 4a-c is that neither the male part 402 nor the female part 401 is rotationally symmetric. This serves to prevent relative rotation of the male and female parts 402, 401, which may facilitate a process of forming an assembly comprising the spherical washer 40. Providing the first and second spherical surfaces as a combination of primary and secondary spherical surfaces may also be useful in tailoring the size of the contact region, and/or in minimizing the size and weight of the spherical washer 40.

The example spherical washer 40 further comprises an additional anti-rotation feature comprising protrusions 411 on the female part 401 and recesses 422 on the male part 402. The additional anti-rotation feature is configured to limit relative rotation about an axis parallel to the bores, of the male and female parts 402, 401, when the male and female parts 402, 401, are engaged. The recesses 422 and protrusions 411 are formed in the secondary spherical surfaces 13b, 14b. In alternative examples the recesses 422 may be provided on the male part 402 and the protrusions on the female part 401, and they may have a form different to that shown in FIGS. 4a-c.

The anti-rotation features of the example spherical washer 40 are particularly advantageous because this washer is configured to accommodate two tension fasteners at substantially the same fastening location. Consequently, spherical washer 40 comprises two bores having parallel axes (at least in a nominal engaged configuration of the washer 40), each bore extending through the male part 402 and the female part 401. Each bore is formed by a first bore part defined by the female part 401 and a second bore part defined by the male part 402. Thus, the female part 401 comprises two first bore parts 46a, 46b and the male part 402 comprises two corresponding second bore parts 46a', 46b'. The bores are arranged relative to the spherical surfaces such that the primary spherical surface 14a of the female part 401 encompasses the two first bore parts 46a, 46b and the primary spherical surface 13a of the male part 402 encompasses the two second bore parts 46a', 46b'.

In an assembly comprising the spherical washer 40, the wing component and the engine mounting pylon component would be held together by three pairs of tension fasteners, each pair comprising a primary tension fastener and a secondary tension fastener. The primary and secondary tension fastener in a given pair would each be sized to be able individually to transfer the full operational load expected to be experienced by the assembly during operation in an aircraft. Providing a pair of tension fasteners at each fastening location therefore provides fail-safe functionality. It may be advantageous to use a pair of tension fasteners rather than a fail-safe fastener as described above, because each tension fastener of the pair can be a standard tension fastener without any special features.

The primary and secondary tension fasteners of a given pair would be located close enough to each other that they can be considered to both be positioned at a fastening location for the purposes of the invention. Furthermore, both the primary and secondary fasteners of a given pair would be encompassed within a single spherical surface. For example, the primary and secondary fasteners encompassed by a spherical surface may be located equal distances from a centre (as defined by the curvature) of that spherical surface. It will be appreciated that any substantial degree of relative rotation of the male and female parts 402, 401, away from the nominal configuration shown in FIG. 4a, about an axis parallel to the axes of the first bore parts 46a, 46b, would result in a misalignment of the first and second bore parts 46a, 46b, 46a', 46b' that would make it difficult or impossible to install tension fasteners into the bores.

The spherical washer 40 may, in some examples, further comprise a retention clip (not illustrated). The retention clip is configured to retain the male and female parts 402, 401 in engagement with each other. More particularly, the retention clip is configured to permit relative pivoting of the male and female parts 402, 401 and to substantially prevent separation of the male and female parts 402, 401. Such a clip may facilitate forming an assembly in which the spherical washer is comprised. For example, it may be desirable to attach the complete washer 40 to one of a wing component and a pylon component and then offer up the other of the wing component and the pylon component to the washer 40, rather than trying to mate the spherical surfaces of the washer 40 after each part of the washer 40 has already been attached to a respective wing component and pylon component. The retention clip may comprise, for example, a resilient attachment between the male and female parts 402, 401. The retention clip may be removable after formation of the assembly, or it may be configured to remain in place during operation of the assembly.

Figure 5:
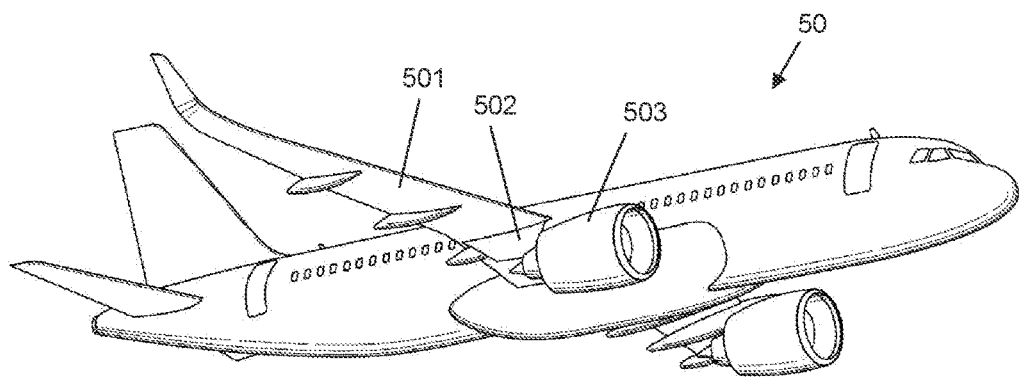
FIG. 5 is a perspective view of an example aircraft comprising an assembly according to the invention.

FIG. 5 shows an aircraft 50 which comprises one or more aircraft assemblies according to the invention. In particular, the aircraft 50 comprises a wing 501, to which an engine mounting pylon 502 is attached. A component of the wing 501 and a component of the pylon 502 together form an aircraft assembly according to the invention, such as the example assembly 1 described above. An Ultra-High-Bypass Ratio (UHBR) engine 503 is mounted on the engine mounting pylon 502. The engine mounting pylon 502 is close-coupled to the wing 501. The aircraft 50 also includes a further wing, engine mounting pylon and UHBR engine. The further wing and engine mounting pylon may also comprise an assembly according to the invention.

Figure 6:
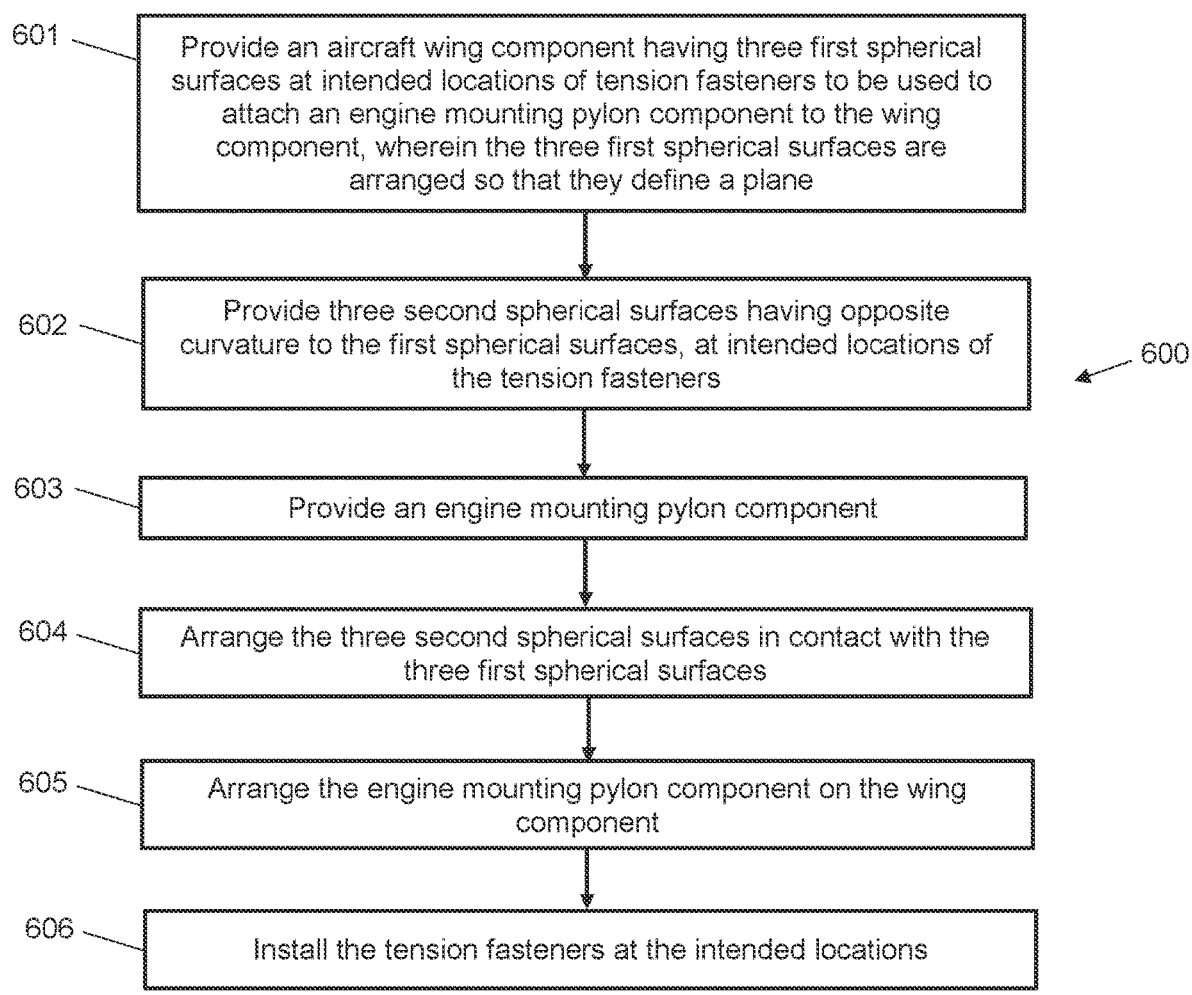
FIG. 6 is an example method of forming an assembly according to the invention.

FIG. 6 is a flow chart illustrating an example method 600 of forming an aircraft assembly according to the invention, such as the assembly 1 described above.

In a first block 601, an aircraft wing component is provided. The wing component has three first spherical surfaces at intended locations of tension fasteners to be used to attach an engine mounting pylon component to the wing component. The three first spherical surfaces are arranged so that they define a plane. Any or all of the first spherical surfaces may be formed integrally with the main structure of the wing component, or may be on a separate structure fixedly attached to the main structure of the wing component. In some examples any or all of the first spherical surfaces may be on of interface fittings or parts thereof. Such interface fittings may have any of the features of the example interface fittings described above. The wing component may have any of the features of the example wing component 11 described above. The wing component may be provided as part of a wing box. For example, the wing component may be a skin panel of a wing box. In such cases, the wing box may be fully assembled at the time of performing the method 600, such that access to a space inside the wing box is difficult or impossible.

In block 602 three second spherical surfaces having opposite curvature to the first spherical surfaces are provided, at intended locations of the tension fasteners. The second spherical surfaces may have any of the features of the example spherical surfaces described above. In some examples the second spherical surfaces may be provided as part of interface fittings. Such interface fittings may have any of the features of the example interface fittings described above. In such examples the second spherical surfaces may be provided separately to providing an engine mounting component which is to be joined to the wing component. Alternatively, the second spherical surfaces may be integral with an engine mounting component which is to be joined to the wing component, in which case block 602 necessarily occurs simultaneously with and as part of the same process step as block 603.

In block 603 an engine mounting pylon component is provided. The engine mounting pylon component may have any of the features of the example engine mounting pylon component 12 described above. The engine mounting pylon component may be provided as part of an engine mounting pylon. The engine mounting pylon may or may not be fully assembled at the time of performing the method 600. In some examples it may be necessary or desirable to be able to access a surface of the engine mounting pylon component opposite to a surface which is intended to face the wing component, and such access may require that the engine mounting pylon is not fully assembled at the time of performing the method 600. In some examples (such as examples in which the three second spherical surfaces are integrated with the engine mounting pylon component) block 603 necessarily occurs simultaneously with and as part of the same process step as block 602.

In block 604 the three second spherical surfaces are arranged in contact with the three first spherical surfaces. The curvature of the second spherical surfaces matches (that is, it is equal and opposite to) the curvature of the first spherical surfaces, meaning that after the performance of block 604 there is close contact between the first and second spherical surfaces over a significant area of those surfaces. In examples in which the spherical surfaces are provided as part of separate components to the engine mounting component (e.g. interface fittings), those separate components may be retained on the first spherical surfaces in a manner which substantially prevents separation of the first and second spherical surfaces but permits relative pivoting thereof. For example, the first and second spherical surfaces may be comprised in complementary parts of an interface fitting which has a retention mechanism (such as a resilient clip, tether or the like) for holding the fitting parts together. In such examples arranging the second spherical surfaces in contact with the first spherical surfaces may comprise engaging a retention mechanism of an interface fitting to hold the parts of that interface fitting together.

Due to the possibility of relative pivoting of the first and second spherical surfaces after the second spherical surfaces have been arranged in contact with the first spherical surfaces, it is not necessary to arrange the second spherical surfaces at any particular orientation relative to the first spherical surfaces. This makes it possible to perform block 605 very quickly. Block 605 may be performed manually by a human operator, or automatically (e.g. by an industrial robot). In examples in which the second spherical surfaces are integral with the engine mounting component, arranging the second spherical surfaces in contact with the first spherical surfaces is performed as part of arranging the engine mounting pylon component on the wing component (block 605), in which case block 604 necessarily occurs simultaneously with and as part of the same process step as block 605.

In block 605 the engine mounting component is arranged on the wing component. The wing component and the engine mounting component may be supported in any suitable manner (e.g. by jigs) during the performance of block 605. In examples in which the second spherical surfaces are not integral with the engine mounting pylon and have been arranged on the first spherical surfaces prior to the performance of block 605, arranging the engine mounting component on the wing component comprises bringing an upper surface of the engine mounting component into contact with lower surfaces of the components in which the second spherical surfaces are comprised. For example, arranging the engine mounting component on the wing component comprises bringing an upper surface of the engine mounting component into contact with lower surfaces of interface fittings. The lower surfaces of the interface fittings may be shaped to match the upper surface of the engine mounting pylon, so that close contact is achieved across substantially the full area of the lower surfaces of the interface fittings. In such examples, the upper surface of the engine mounting component may comprise engagement features such as recesses, locating features, reinforced regions or the like, at locations corresponding to the locations of the interface fittings, to facilitate arranging the engine mounting component on the wing. In such examples, arranging the engine mounting pylon on the wing box may comprise engaging the interface fittings with the engagement features.

As explained above in relation to FIGS. 3 and 4, in examples in which the first and second spherical surfaces are comprised in interface fittings, the two parts of each interface fitting are able to pivot relative to each other by virtue of the design of the interface fitting, and the design of any retention mechanism used to hold the two parts of the interface fitting together. Therefore, when the upper surface of the engine mounting pylon is brought into contact with the lower surfaces of the interface fittings during the performance of block 605, this may (depending on whether the lower parts of the interface fittings are already aligned with the engine mounting pylon) cause the lower part of one or more of the interface fittings to pivot relative to the upper part until the lower surface is aligned with the upper surface of the engine mounting pylon. When each interface fitting lower surface is aligned with the upper surface of the engine mounting pylon, that lower surface will be in contact with the upper surface of the engine mounting pylon across (at least substantially) the full area of that lower surface. This alignment is achieved automatically, provided that the first and second spherical surfaces are at the correct positions on the wing component and the engine mounting pylon component respectively.

In some examples (such as examples in which the three second spherical surfaces are integrated with the engine mounting pylon component) block 605 necessarily occurs simultaneously with and as part of the same process step as block 604. In such examples performing block 605 (and block 604) comprises bringing the second spherical surfaces (which are on an upper surface of the engine mounting component) into contact with the first spherical surfaces (which are on a lower surface of the wing component), for example by offering up the engine mounting component to the wing component.

As explained above, the triangular arrangement of the first and second spherical surfaces, together with their spherical shape, means that close contact between the first and second spherical surfaces, across a significant area of those surfaces, is achievable irrespective of any variations in the orientation or position of the first spherical surfaces relative to the wing component, or of any variations in the orientation or position of the second spherical surfaces relative to the pylon component. Consequently, block 605 can be simple and fast to perform, and a satisfactory join is ensured despite any manufacturing tolerances.

In block 606, the tension fasteners are installed at the intended locations. The tension fasteners may have any of the features of the example tension fasteners described above. The tension fasteners are installed by inserting a stem part of each fastener into a bore extending through the components to be joined (that is, the wing component, the engine mounting pylon component, and the interface fitting if present). The bore (which is made up of several bore parts, one bore part being formed by each component through which the tension fastener will extend after installation) may have any of the features of the example fastener bores and bore parts described above. Installing the tension fasteners may comprise creating fastener bore parts in one or more of the wing component, the engine mounting component, and an interface fitting. In some examples, fastener bore parts are already present in at least some of the components through which the tension fasteners will, before block 606 is commenced. Installing the tension fasteners may comprising tightening each tension fastener to a predetermined torque. The tension fasteners may be installed manually by a human operator, or automatically (e.g. by an industrial robot). Upon completion of block 606, the wing component and the engine mounting pylon component are held together against separation by the tension fasteners, and an assembly according to the invention has been formed.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:
1. An aircraft assembly comprising:
a wing component comprising a triangular arrangement consisting of three fastening locations arranged in a triangle and in a plane;
an engine mounting pylon component connected to the wing component by three tension fasteners, wherein each of the three tension fasteners is secured to the engine mounting pylon component, -passes through a different one of the three fastening locations and is secured to the wing component;
wherein the wing component comprises three first spherical surfaces positioned such that the three first spherical surfaces each have a center, each of the centers is at a different one of the three fastening locations, and each of the three tension fasteners extends through a different one of the first spherical surfaces;
wherein the engine mounting pylon component comprises three second spherical surfaces having equal and opposite curvature to the three first spherical surfaces, each of the three second spherical surfaces are in contact with a different one of the three first spherical surfaces and each of the three tension fasteners extends through a different one of the three second spherical surfaces, and
wherein the triangular arrangement provides the three fastening locations on the wing component for fastening the engine mounting pylon component to the wing component.
2. The aircraft assembly according to claim 1, wherein for each pair of contacting spherical surfaces, a convex spheri- cal surface of the pair has a greater surface area than a concave spherical surface of the pair.

3. The aircraft assembly according to claim 1, wherein the aircraft assembly is configured such that, during operation of the aircraft assembly on an aircraft, each tension fastener transfers only vertical load between the engine mounting pylon component and the wing component.

4. The aircraft assembly according to claim 1, wherein a surface of the wing component faces the engine mounting pylon component and is curved, and
wherein a surface of the engine mounting pylon component faces the wing component and is substantially flat.

5. The aircraft assembly according to claim 1, wherein each first spherical surface is formed integrally with the wing component and each second spherical surface is formed integrally with the engine mounting pylon component.

6. The aircraft assembly according to claim 1, wherein an interface fitting is present at each of the three fastening locations, the interface fitting comprising:
a first part comprising the first spherical surface and being fixedly attached to the wing component; and
a second part comprising the second spherical surface and being fixedly attached to the engine mounting pylon component.

7. The aircraft assembly according to claim 6, wherein the interface fitting comprises a spherical washer.

8. The aircraft assembly according to claim 1, further comprising at least one thrust-transferring connection between the engine mounting pylon component and the wing component.

9. The aircraft assembly according to claim 8, wherein the aircraft assembly is configured such that, during operation of the aircraft assembly on an aircraft, the or each thrust-transferring connection transfers only lateral load between the engine mounting pylon component and the wing component.

10. The aircraft assembly according to claim 8, wherein the at least one thrust-transferring connection comprises a spigot.

11. The aircraft assembly according to claim 1, wherein at least one of the three tension fasteners comprises a fail-safe fastener.

12. The aircraft assembly according to claim 1, wherein a secondary tension fastener is associated with each tension fastener, each secondary tension fastener being located at substantially the same location as the associated tension fastener.

13. The aircraft assembly according to claim 12, wherein each first spherical surface and corresponding second spherical surface encompasses a first bore through which one of the tension fasteners extends and a second bore through which the associated secondary tension fastener extends.

14. An aircraft comprising the aircraft assembly of claim 1.

15. The aircraft according to claim 14, further comprising an ultra-high bypass ratio (UHBR) engine mounted on the engine mounting pylon component.

16. A method of forming an aircraft assembly, the method comprising:
providing an aircraft wing component including a triangular arrangement consisting of with three fastening locations arranged in a triangle and in a plane, wherein the aircraft wing component includes having three first spherical surfaces each at a respective one of the fastening locations and the three first spherical surfaces are each configured to receive a respective tension fastener configured for use to attach an engine mounting pylon to the wing component;
providing the engine mounting pylon with three second spherical surfaces each having an opposite curvature to a curvature of the first spherical surfaces, wherein each of the three second spherical surfaces are at a respect one of the three fastening locations;
arranging the three second spherical surfaces in contact with the three first spherical surfaces;
arranging the engine mounting pylon on the aircraft wing component; and
installing the tension fasteners at the three fastener locations,
wherein each of the tension fasteners extends through different ones of the three fastener locations, the three first spherical surfaces and the three second spherical surfaces,
wherein each of the tension fasteners is secured to the engine mounting pylon and to the aircraft wing component, and
wherein the triangular arrangement provides are the three fastening locations on the wing component for fastening the wing component to the engine mounting pylon.

* * * * *